(No Model.)

C. H. SMITH.
METHOD OF MAKING AXLE ARMS.

No. 352,492. Patented Nov. 9, 1886.

$a$ $b\ c$    $d$ $e$    $b\ c$    $d$ $e$    $b\ c$    $d$

Witnesses:
W. M. Bjorkman.
H. R. Williams.

Inventor -
Charles H. Smith,
by Simonds & Burdett,
Attys

UNITED STATES PATENT OFFICE.

CHARLES H. SMITH, OF NORFOLK, CONNECTICUT, ASSIGNOR OF ONE-HALF TO ELLSWORTH D. IVES, OF SAME PLACE.

METHOD OF MAKING AXLE-ARMS.

SPECIFICATION forming part of Letters Patent No. 352,492, dated November 9, 1886.

Application filed February 15, 1886. Serial No. 191,915. (No model.)

*To all whom it may concern:*

Be it known that I, CHARLES H. SMITH, of Norfolk, in the county of Litchfield and State of Connecticut, have invented a certain new and useful Improvement in the Method of Making Axle-Arms, of which the following is a full, clear, and exact description, whereby any one skilled in the art can practice the same.

The object of my improvement is to provide a method by which axle-arms can be produced by a simple process that both cheapens and betters axle-arms that are made of iron, steel, or like metal; and my improvement consists in the following steps: First, heating a billet of metal to a welding heat and roughly forging an axle-arm from the collar outward; second, reheating to a much less degree the partly-formed blank and completely forming and shaping the axle-arm by repeated blows in finishing-dies; and, finally, burnishing and highly polishing the surface of the arm, as more particularly hereinafter described, and pointed out in the claims.

Figure 1:
Figure 2:
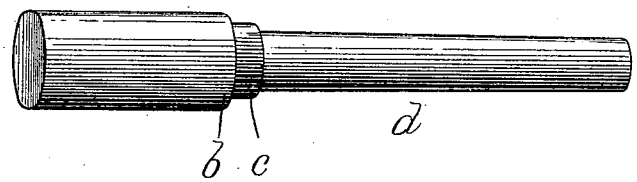
Figure 3:
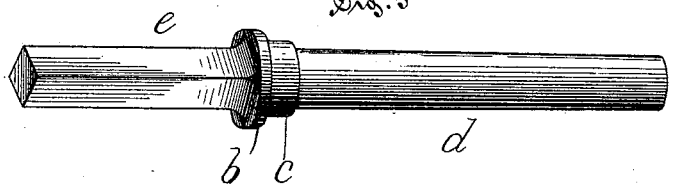
Figure 4:
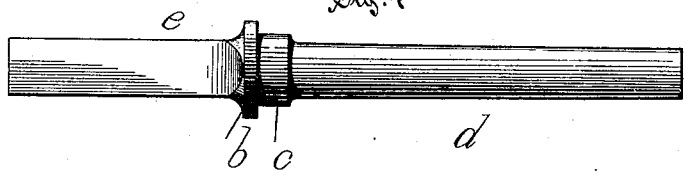

Referring to the accompanying drawings, Figure 1 is a detail view of a billet of metal. Fig. 2 is a view of the billet with the partly-formed axle arm on one end. Fig. 3 is a view of the blank showing the axle-arm and the bed formed to shape. Fig. 4 is a view of the finished arm and bed.

In the manufacture of axle-arms prior to my invention the process is substantially as follows: A billet, *a*, of metal, as iron or steel, cylindrical in form and of a diameter substantially that of the diameter of the collar of the axle-arm to be made from the billet, is heated to a welding heat, and then, by means of a hammer or drop-press, the collar *b*, swell-shoulder *c*, and arm *d* are forged or formed in rough outline. After cooling, the shank of the billet is heated to a welding heat and the bed *e* is forged to its final shape. The axle-arm in all its parts is then finished by turning or milling and then polishing. By the practice of this prior method it is difficult, and, from a merchantable point of view, impracticable to turn the smaller sizes of axles true and round.

The hammering to which the metal is subjected in the process of forging compacts the outer surface and hardens it to a greater degree than it is in the interior of the mass, and in turning or milling the axle-arm to shape after the forging process, this hard, tough, and compact outer surface is cut away at the expense of the wearing properties of the axle.

In the practice of my improved method a similar billet for making an axle-arm is used, and after heating to a welding heat is subjected to the forging operation, which roughs out the several parts of the axle-arm; the shank of the billet is heated and the bed forged to shape; the arm-blank is then reheated to about a "cherry-red," and its several parts—as collar, swell-shoulder, and arm—are finished to the required size, shape, and contour by repeated blows in finishing-dies, and these finishing-dies are borne in a hammer so constructed that the blows upon the work laid on the anvil are repeated 'in precisely the same relative position throughout the whole finishing operation. The axle-arm is then polished in any ordinary manner that does not perceptibly cut away or injure the surface obtained in the finishing process between the dies.

The advantages of my improved process are the tough, compact, and durable surface obtained by this final finishing process in dies is preserved in the finished axle-arm, and that in this finishing process axles of all sizes—the smallest as well as the large—are formed true to gage and perfectly round; and a further advantage of no little importance is that the saving in the manufacture by the practice of this method is considerable, being from twelve to twenty-two per cent., depending upon the size of axles finished, as compared with the older methods.

The article which is the result of the practice of my within-described process is characterized by its great strength, durability, and cheapness as compared with prior axle-arms, the surface of the axle-arm having many of the desirable qualities and none of the objectionable ones obtained by case-hardening.

I claim as my improvement—

1. The art or method of making axle-arms, which consists in first forging the axle-blank in the rough from a billet of metal, then reheating to about a cherry-red heat the blank, and forming it to final shape by repeated blows between finishing-dies, all substantially as described.

2. The art or method of making axle-arms, which consists in first forging the axle-blank in the rough from a billet of metal, then reheating the blank to about a cherry-red heat to prevent the formation of a scale, and forming the blank to final shape by repeated blows between finishing-dies, and then polishing the wearing-surface of the arm, all substantially as described.

CHARLES H. SMITH.

Witnesses:
CHAS. L. BURDETT,
H. R. WILLIAMS.